(12) United States Patent
Kim et al.

(10) Patent No.: US 9,242,861 B2
(45) Date of Patent: Jan. 26, 2016

(54) AMORPHOUS CARBON-BORON NITRIDE NANOTUBE HYBRIDS

(71) Applicant: The United States of America as represented by the Administrator of the National Aeronautics and Space Administration, Washington, DC (US)

(72) Inventors: Jae Woo Kim, Newport News, VA (US); Emilie J. Siochi, Newport News, VA (US); Kristopher E. Wise, Poquoson, VA (US); Yi Lin, Yorktown, VA (US); John Connell, Yorktown, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 112 days.

(21) Appl. No.: 13/694,286

(22) Filed: Nov. 15, 2012

(65) Prior Publication Data
US 2014/0134352 A1    May 15, 2014

(51) Int. Cl.
| | | |
|---|---|---|
| *C23C 16/26* | (2006.01) | |
| *C01B 21/064* | (2006.01) | |
| *B23K 15/00* | (2006.01) | |
| *B82Y 30/00* | (2011.01) | |

(52) U.S. Cl.
CPC ......... *C01B 21/0648* (2013.01); *B23K 15/0086* (2013.01); *B82Y 30/00* (2013.01); *C01P 2004/04* (2013.01); *C01P 2004/13* (2013.01)

(58) Field of Classification Search
CPC ...................................................... C23C 16/26
USPC ........................................... 427/249.1, 249.7
See application file for complete search history.

(56) References Cited

U.S. PATENT DOCUMENTS

| | | | |
|---|---|---|---|
| 2005/0205847 A1* | 9/2005 | Dailly et al. | 252/378 R |
| 2008/0144304 A1* | 6/2008 | Culpepper et al. | 361/820 |
| 2010/0227058 A1* | 9/2010 | Zhang | B82Y 30/00 427/249.1 |
| 2011/0203791 A1* | 8/2011 | Jin et al. | 166/244.1 |

OTHER PUBLICATIONS

Kim, Jae-Woo, et al., "In situ mechanical property measurements of amorphous carbon-boron nitride nanotube nanostructures". Nanotechnology 23 (2012) 035701, pp. 1-9.*
Smith, Michael W., et al., "Very long single- and few-walled boron nitride nanotubes via the pressurized vapor/condenser method". Nanotechnology 20 (2009) 505604, pp. 1-6.*
Wang, Jiesheng, et al., "Multiwalled Boron Nitride Nanotubes: Growth, Properties, and Applications." B-C-N. Nanotubes and Related Nanostructures, 2009, pp. 23-44.*
Zhi, Chunyi, et al., "Grafting Boron Nitride Nanotubes: From Polymers to Amorphous and Graphitic Carbon". J. Phys. Chem. C 2007, 111, 1230-1233.*

* cited by examiner

*Primary Examiner* — Bret Chen
(74) *Attorney, Agent, or Firm* — Jennifer L. Riley

(57) ABSTRACT

A method for joining or repairing boron nitride nanotubes (BNNTs). In joining BNNTs, the nanotube structure is modified with amorphous carbon deposited by controlled electron beam irradiation to form well bonded hybrid a-C/BNNT structures. In repairing BNNTs, the damaged site of the nanotube structure is modified with amorphous carbon deposited by controlled electron beam irradiation to form well bonded hybrid a-C/BNNT structures at the damage site.

18 Claims, 8 Drawing Sheets

AMORPHOUS CARBON-BORON NITRIDE NANOTUBE HYBRIDS

STATEMENT REGARDING FEDERALLY SPONSORED RESEARCH OR DEVELOPMENT

The U. S. Government has a paid-up license in this invention and the right in limited circumstances to require the patent owner to license others on reasonable terms as provided for by the terms of Cooperative Agreement No. NCC-1-02043 awarded by the National Aeronautics and Space Administration.

BACKGROUND OF THE INVENTION

1. Field of the Invention

The present invention relates to nanocomposites, and, more particularly to amorphous carbon-boron nitride nanotube (BNNT) hybrids.

2. Description of Related Art

All references listed in the appended list of references are hereby incorporated by reference, however, as to each of the above, to the extent that such information or statements incorporated by reference might be considered inconsistent with the patenting of this/these invention(s) such statements are expressly not to be considered as made by the applicant(s). The reference numbers in brackets below in the specification refer to the appended list of references.

Utilizing the full mechanical capabilities of individual nanotubes is a primary research goal in nanotube reinforced nanocomposite materials. Most studies on structural applications of nanomaterials, such as carbon nanotubes (CNTs), have focused on attempts to improve dispersion in structural matrices to achieve or exceed the performance of state-of-the-art carbon fiber reinforced polymer ("CFRP") composites. This approach has yet to yield mechanical properties that compete with CFRPs, the aerospace structural material of choice [10, 11], because CNTs have not demonstrated the load carrying capacity of carbon fibers due to poor intertube load transfer and physical defects created during processing and fabrication. Practical use of these nanomaterials requires creating stable and strong linkages between nanotubes without sacrificing their mechanical advantage. Cross-linking between shells via electron beam irradiation [12-15] and application of large compressive forces [16] have been studied and offer a viable approach to improve tube-to-tube load transfer and hence, mechanical properties. However, these approaches result in unwanted mechanical degradation and have limitations in scale-up for their applications to hierarchical macroscopic nanocomposite materials.

It is a primary aim of the present invention to use amorphous carbon (a-C) to form stable connections between the tubes using electron beam irradiation.

It is an object of the invention to provide a method for in-situ transmission electron microscope (TEM)-atomic force microscope (AFM) techniques which precisely position BNNT specimens and use electron beam radiation to deposit a-C to modify and join BNNTs one or more times.

It is an object of the invention to provide a method for joining BNNTs in which the a-C joint on BNNT structures is comparable with those of currently available structural fibers and films such as both CNT and BNNT yarns, carbon fibers, carbon fiber reinforced composites, both CNT and BNNT sheets, both CNT and BNNT composites and mixed composites of CNTs, boron carbon nitrides (BCN)s, and BNNTs.

It is an object of the invention to provide a method for a-C welding of BNNT structures which transfers load between the tubes for structural material designs.

Finally, it is an object of the present invention to accomplish the foregoing objectives in a simple and cost effective manner.

The above and further objects, details and advantages of the invention will become apparent from the following detailed description, when read in conjunction with the accompanying drawings.

SUMMARY OF THE INVENTION

The present invention addresses these needs by providing a method for joining or repairing boron nitride nanotubes ("BNNTs"). In the joining method, a plurality of BNNTs is provided and amorphous carbon is deposited on the surface of the BNNTs to form well bonded hybrid a-C/BNNT structures. The BNNTs are preferably fabricated by a pressurized vapor/condenser method using a $CO_2$ laser and are preferably highly crystalline. The BNNTs preferably consist of few-walled BNNTs having diameters of less than 7 nm. The amorphous carbon is preferably deposited on the BNNT surface by electron beam induced deposition. To repair boron nitride nanotubes ("BNNTs"), at least one damaged BNNT is provided and amorphous carbon is deposited on the surface of the at least one BNNT at the damage site to form hybrid a-C/BNNT at the damage site; the remaining steps are the same as for joining BNNTs. Finally, these steps can be used for forming hybrid a-C/BNNT boron nitride nanotubes ("BNNTs") structures by depositing amorphous carbon on the surface of the BNNTs to form well bonded hybrid a-C/BNNT structures.

BRIEF DESCRIPTION OF THE DRAWINGS

A more complete description of the subject matter of the present invention and the advantages thereof, can be achieved by reference to the following detailed description by which reference is made to the accompanying drawings in which:

FIG. 2a shows a TEM image of an individual BNNT tested under compression before buckling;

FIG. 2b shows a TEM image of an individual BNNT tested under compression after buckling;

FIG. 2c shows a force displacement curve for the compressive test is shown in FIGS. 2a and 2b;

FIG. 2d shows a TEM image of a pristine BNNT under tension before breaking;

FIG. 2e shows a TEM image of a pristine BNNT under tension after breaking;

FIG. 2f shows a reconstructed stress-strain curve of the BNNT shown in FIGS. 2d and 2e;

FIGS. 3a-3g show a series of TEM images during multiple tensile tests with a-C/BNNT hybrid specimens in which:

FIG. 3a shows a TEM image before a-C/BNNT welding on the AFM tip by electron beam induced deposition (EBID);

FIG. 3b shows a TEM image after a-C/BNNT welding on the AFM tip by EBID;

FIG. 3c shows a TEM image after a first tensile test with the a-C/BNNT hybrid;

FIG. 3d shows a TEM image at the failure site after touching the broken pieces together;

FIG. 3e shows a TEM image after a second tensile test after tip-to-tip connection using a-C to repair the broken area;

FIG. 3f shows a TEM image after a second tensile test after tip-to-tip connection using a-C by EBID at the failure location of the first test to repair the broken area;

FIG. 3g shows reconstructed stress-displacement curves from the first and second tensile tests;

FIG. 4a shows a TEM image of a pristine BNNT attached to the AFM tip with a-C by using electron beam irradiation and then tested under compression until it fractured, but did not completely break in two;

FIG. 4b shows a TEM image of a pristine BNNT attached to the AFM tip with a-C by using electron beam irradiation and then tested under compression until it fractured, but did not completely break in two;

FIG. 4c shows a TEM image of a pristine BNNT attached to the AFM tip with a-C by using electron beam irradiation and then tested under compression until it fractured, but did not completely break in two;

FIG. 4d shows a TEM image of a pristine BNNT attached to the AFM tip with a-C by using electron beam irradiation and then tested under compression until it fractured, but did not completely break in two;

FIG. 4e shows the a-C/BNNT specimen repaired using a-C by electron beam joining;

FIG. 4f shows a second compression testing of the repaired a-C/BNNT hybrid until it fractured prior to ultimate failure;

FIG. 4g shows a second compression testing of the repaired a-C/BNNT hybrid until it fractured prior to ultimate failure;

FIG. 4h shows the new fracture which did not appear at the previous repair site, but rather developed at a different location during the second compression test shown in FIGS. 4f and 4g;

FIG. 4i shows the new fracture which did not appear at the previous repair site, but rather developed at a different location during the second compression test shown in FIGS. 4f and 4g;

FIG. 4j shows a third compression testing of the repaired a-C/BNNT hybrid;

FIG. 4k shows force-displacement data for each of the first, second and third compressions tests in FIGS. 4a-4j;

FIG. 5a shows a TEM image of the initial tensile test performed on the twice repaired compression specimen shown in FIG. 4j;

FIG. 5b shows a TEM image of the initial tensile test performed on the twice repaired compression specimen shown in FIG. 4j after complete breakage of the sample;

FIG. 5c shows electron beam induced end-to-end joining with a-C of the severed hybrid a-C/BNNT specimen;

FIG. 5d shows electron beam induced end-to-end joining with a-C of the severed hybrid a-C/BNNT specimen in which to form an end-to-end joint bonded with a-C, one broken end was precisely aligned with another broken end and joined with a-C;

FIG. 5e shows the repaired sample subjected to tensile testing again and the failure occurring at the same location;

FIG. 5f shows the repaired sample subjected to tensile testing again and the failure occurring at the same location;

FIG. 5g shows the stress-strain curve for the test performed in FIGS. 5a through 5f;

DETAILED DESCRIPTION OF THE PREFERRED EMBODIMENT

Figure 1A:
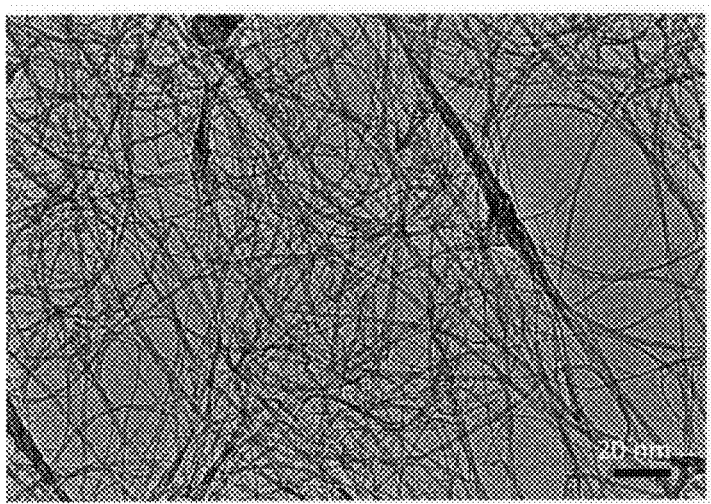
FIG. 1a shows a representative high resolution-TEM (JEOL JEM-2100F) image of BNNT bundles fabricated by the pressurized vapor/condenser method using a $CO_2$ laser.
Figure 1B:
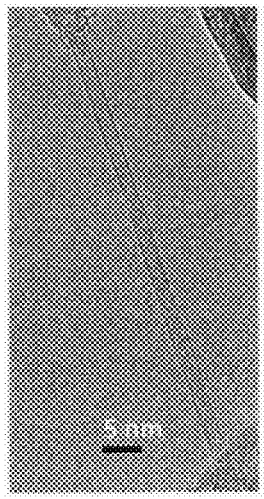
FIG. 1b shows a representative high resolution-TEM (JEOL JEM-2100F) image of single-walled BNNTs fabricated by the pressurized vapor/condenser method using a $CO_2$ laser.
Figure 1C:
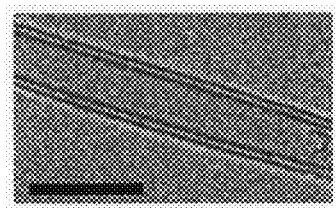
FIG. 1c shows a representative high resolution-TEM (JEOL JEM-2100F) image of double-walled BNNTs fabricated by the pressurized vapor/condenser method using a $CO_2$ laser.
Figure 1D:
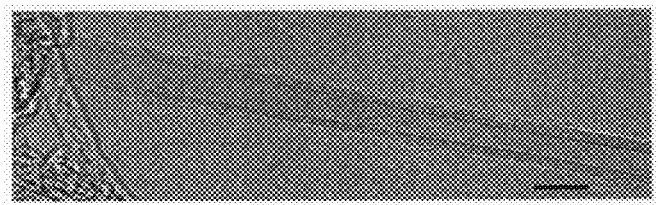
FIG. 1d shows a representative high resolution-TEM (JEOL JEM-2100F) image of quadruple-walled BNNTs fabricated by the pressurized vapor/condenser method using a $CO_2$ laser.

The following detailed description is of the best presently contemplated mode of carrying out the invention. This description is not to be taken in a limiting sense, but is made merely for the purpose of illustrating general principles of embodiments of the invention. The embodiments of the invention and the various features and advantageous details thereof are more fully explained with reference to the non-limiting embodiments and examples that are described and/or illustrated in the accompanying drawings and set forth in the following description. It should be noted that the features illustrated in the drawings are not necessarily drawn to scale, and the features of one embodiment may be employed with the other embodiments as the skilled artisan recognizes, even if not explicitly stated herein. Descriptions of well-known components and techniques may be omitted to avoid obscuring the invention. The examples used herein are intended merely to facilitate an understanding of ways in which the invention may be practiced and to further enable those skilled in the art to practice the invention. Accordingly, the examples and embodiments set forth herein should not be construed as limiting the scope of the invention, which is defined by the appended claims. Moreover, it is noted that like reference numerals represent similar parts throughout the several views of the drawings.

Generally, the present invention relates to CNTs which have received significant attention due to their outstanding combination of mechanical, electrical and thermal properties. However, applications requiring greater thermal and chemical stability (above 300 to 400° C. in air) have led to the exploration of alternative compositions that provide similar structural performance. Among those compositions is boron nitride, the nanotube form of which, BNNT, offers mechanical and thermal properties comparable to CNTs. In addition, chemical stability, piezoelectric characteristics, and the radiation shielding potential of BNNTs make them attractive for aerospace applications [1]. The theoretical elastic modulus of BNNTs is ~0.9 TPa [2]. Values ranging from 0.5 to 1.22 TPa have been determined experimentally [3, 4]. In comparison, measured moduli for CNTs range from 1.28 to 1.8 TPa [5, 6]. Recently, tensile strength and strain of multi-walled BNNTs have been measured by Golberg and coworkers [7] using a TEM equipped with an AFM holder in the TEM. The breaking strength and strain of BNNTs were reported to be ~33.2 GPa and ~3.4%, respectively, whereas CNTs have exhibited breaking strengths ranging from 11 to 63 GPa [8, 9] and failure strain of 1.6% [9] under tensile load. To understand the mechanical properties of a-C/boron nitride nanotube (BNNT) nanostructures, in-situ mechanical tests have been conducted inside a TEM equipped with an integrated AFM system. The nanotube structure was modified with amorphous carbon deposited by controlled electron beam irradiation. Multiple in-situ tensile, compressive, and lap shear tests were demonstrated with a-C/BNNT hybrid nanostructures. The tensile strength of the a-C/BNNT hybrid nanostructure was 5.29 GPa with about 90.% vol of a-C. The tensile strength and strain of the end-to-end joint structure with a-C welding is 0.8 GPa and 5.2% whereas the lap shear strength of the side-by-side joint structure with a-C was 0.25 GPa.

The essential concept in this work is on potential advantages arising from the use of amorphous carbon (a-C) to adhere individual BNNTs physically to produce macroscopic nanostructural materials. Multiple in-situ tensile, compressive, and lap shear tests of a-C-bonded BNNT hybrid nanostructures were performed. Both fractured and completely broken specimens were subsequently repaired multiple times between tests by deposition of additional a-C using electron beam irradiation and then retested with the repaired area positioned within the gauge length. While it would clearly be preferable to achieve pristine BNNT properties in a bulk material, the weak load transfer between concentric shells in multi-walled tubes and between adjacent tubes in bundles prevents their effective use in mechanical applications, especially under tensile loading. Utilization of these nanomaterials in a bulk structural component will, therefore, require some means of creating strong physical or chemical bonds between them. This work demonstrates the viability of using a-C to form stable connections between the tubes using electron beam irradiation. Specifically, we used in-situ TEM-AFM techniques to precisely position BNNT specimens and used electron beam radiation to deposit a-C to modify and join BNNTs. Mechanical properties, including tensile, compressive, and lap-shear strength, were measured for both freshly prepared specimens and, repeatedly, for the same samples after electron beam induced deposition (EBID) repair of the fractures. The resulting properties were substantially reduced from those of pristine BNNTs, but comparable with those of currently available structural fibers such as CNT yarn, carbon fibers, and carbon fiber reinforced composites. Therefore, the current approach of a-C welding represents an approach for transferring load between the tubes for future structural material designs.

Experimental Set-Up for In-Situ Mechanical Tests

BNNTs used in this work were fabricated by the pressurized vapor/condenser method using a $CO_2$ laser [17]. These BNNTs were highly crystalline and consisted mostly of few-walled BNNTs with diameters of less than 7 nm as shown in FIGS. 1a-1d.

The mechanical properties of individual pristine BNNTs, and a-C/BNNT hybrids were measured inside a TEM (200 keV, Philips CM200) equipped with an integrated AFM system (TEM-AFM, Nanofactory). To minimize damage to the BNNTs prior to testing, the samples were prepared by touching an as-grown dry BNNT forest with a holey carbon-coated Cu half grid. The sample was fixed on the grid using one drop of ethanol. The assembly was vacuum-dried at 75° C. before testing. Touching an individual BNNT with the conductive Au-coated AFM tip (The spring constant of AFM cantilever was 3.6~4.0 N/m) was sufficient to attach it to the tip for testing. In the case of mechanical testing using a customized sample with the TEM-AFM set-up, one end of the BNNT was attached to the AFM tip with a-C by using electron beam irradiation to ensure good contact between the tube and the tip.

Development of a-C Using e-Beam Irradiation on the BNNT Surface

The structure of nanotubes can be engineered using electron beam [13, 18-25] or ion beam [13] irradiation. The a-C was grown on the BNNT surface by EBID at the contact area for a few minutes without using a liquid nitrogen ($LN_2$) trap to condense gas phase carbon species. The a-C joins BNNTs together to form well bonded hybrid a-C/BNNT structures. The TEM-AFM set-up used in this study allows for in-situ nano-manipulation to position the BNNTs for bonding, structural modification using electron beam, and mechanical measurements such as compression, tensile, and lap shear tests, in addition to conventional TEM tasks such as morphology and chemical composition observation. It is important to note that a-C readily forms with a focused electron beam only when a $LN_2$ trap is not used. Also, a focused electron beam can cause damage to the BNNTs when a $LN_2$ trap is used. Therefore, during mechanical testing the electron beam was spread to minimize BNNT damage.

Compression and Tensile Tests on Pristine BNNTs

Figure 2A:
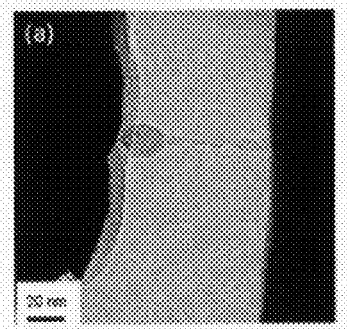
FIGS. 2a-2f show TEM images and force displacement curves of mechanical tests conducted on pristine BNNTs in a TEM-AFM holder inside a TEM.
Figure 2B:
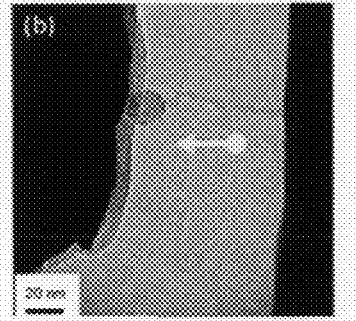
Figure 2C:
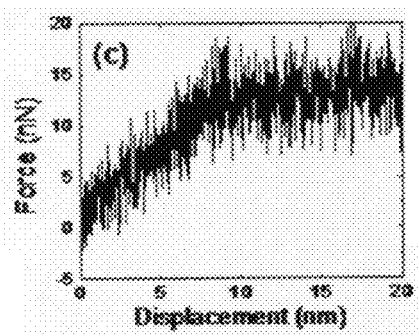

The mechanical tests were conducted on pristine BNNTs in a TEM-AFM holder inside a TEM. Representative TEM images and force displacement curves are presented in FIGS. 2a-2f. The applied force for direct calculation of Young's modulus, tensile strength and strain of an isolated tube were obtained from the forward and reverse movement of the piezo-driven positioning component of the AFM holder. FIGS. 2a and 2b are TEM images of an individual BNNT tested under compression before and after buckling, respectively. In FIG. 2c, a force displacement curve for the compressive test is shown. Buckling of the BNNT samples occurred in the middle of the tube where the diameter is smallest. The Young's modulus of the individual BNNT from the buckling was calculated to be 0.84 TPa, using Euler's formula, which agrees with values discussed in the literature [2, 4]. The Euler's formula was derived for a compression test of a cylinder where column buckling is the predominant failure mode: $F_{Euler} = (\pi^2 \cdot E \cdot I)/L^2$, $I = \pi(d_2^4 - d_1^4)/64$ with E the Young's modulus, I the moment of inertia, L the length of BNNT between the two contact points, $d_2$ the external nominal BNNT diameter, and $d_1$ internal nominal BNNT diameter. In this specific case, the external ($d_2$) and internal ($d_1$) diameters and the length (L) of the tube were 3.1, 1.7, and 52.3 nm, respectively, measured from the TEM image and the buckling stress was around 1.7 GPa. Herein, we used the two-dimensional projection of the external diameter ($d_2$) to calculate the buckling stress due to uncertainty of exact cross-sectional area of the tube.

Figure 2D:
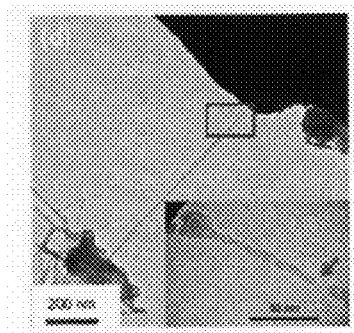
Figure 2E:
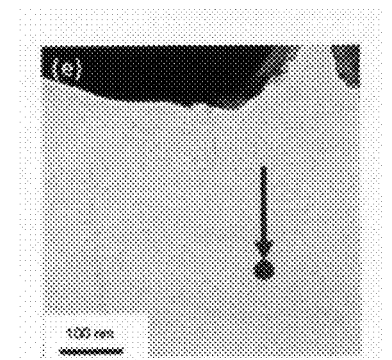
Figure 2F:
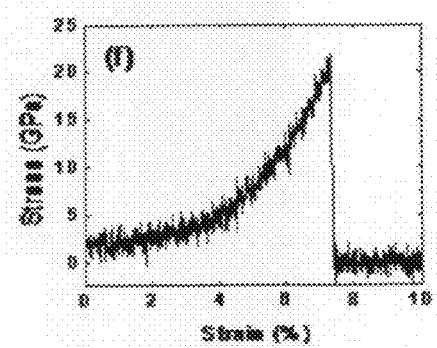

Tensile tests were also performed with few other BNNTs. FIGS. 2d and 2e are representative TEM images of a pristine BNNT under tension before and after breaking, and FIG. 2f is a reconstructed stress-strain curve. The measured tensile strength was 20.7 GPa and the strain was 7.3%. The Young's modulus obtained from linear fitting of the corresponding stress-strain curve (FIG. 2f) was 0.61 TPa, which is close to the value from the compression test. The tensile strength is calculated by assuming that only the outermost shell of the tube carries the tensile load; thus, the cross-sectional area is estimated by $A=\pi \cdot d_2 \cdot d_s$, where, $d_2$ is the external nominal BNNT diameter. For the BNNT shown in FIGS. 2d and 2e, the external diameter ($d_2$) of the BNNT was 2.7 nm, and the interlayer distance ($d_s$) of the tube walls was about 0.34 nm [1]. The energy-to-failure of this individual BNNT was calculated to be 350 J/g using 1.4 g/cm$^3$ as the estimated density of BNNT. This value of the energy at failure is slightly lower than that with isolated double-walled CNT bundles (~500 J/g) [24]. However, the value is much higher than that of state-of-the-art CNT yarns (below 100 J/g) [24]. In the case of an individual BNNT, there is no interaction between tubes which is in contrast to double-walled CNT bundles, nor are there any interactions with polymeric binder and CNTs as is the case with CNT yarns [24]. Note that the measured tensile strain and the energy-to-failure are overestimated due to pre-applied compressive forces necessary to ensure contact during the joining process. The pre-compression applied during tube joining by EBID caused some alignment and stretching of the tube during the early stages of tensile loading which results in a relatively small stress within the 4% strain observed in FIG. 2f. It is worthwhile to note that most of the samples broke at or near the joint on the AFM tip and their tensile strengths were measured to be below 10 GPa. A contributing factor to the lower strengths may be the damage of the tube structure during the AFM tip-BNNT joining process under electron beam irradiation.

Tensile Tests on a-C/BNNT Hybrid

Figure 3A:
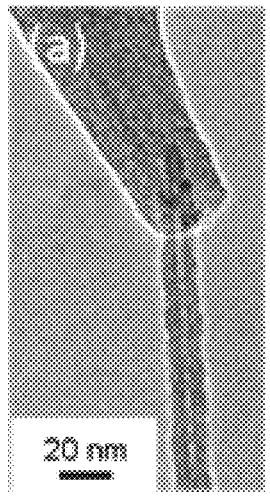
Figure 3B:
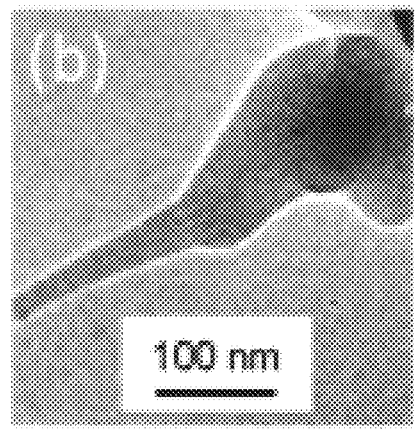
Figure 3C:
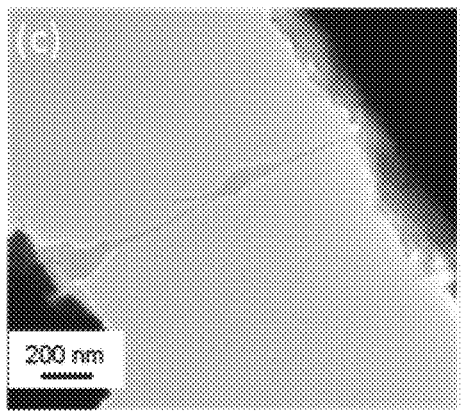
Figure 3D:
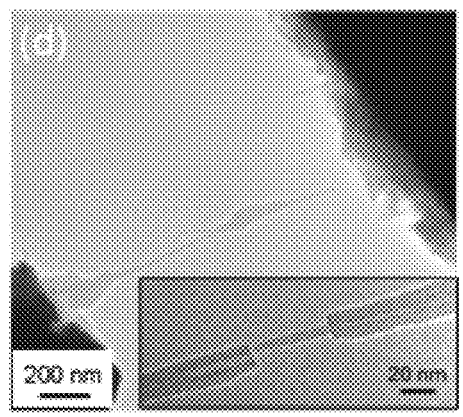
Figure 3E:
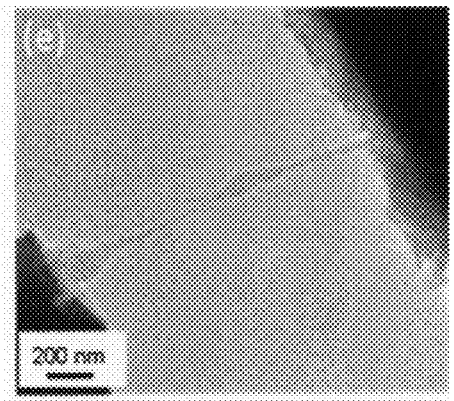
Figure 3F:
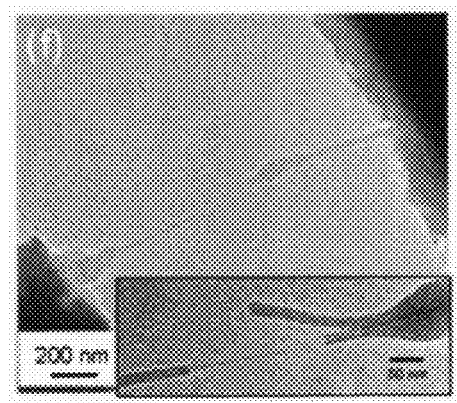
Figure 3G:
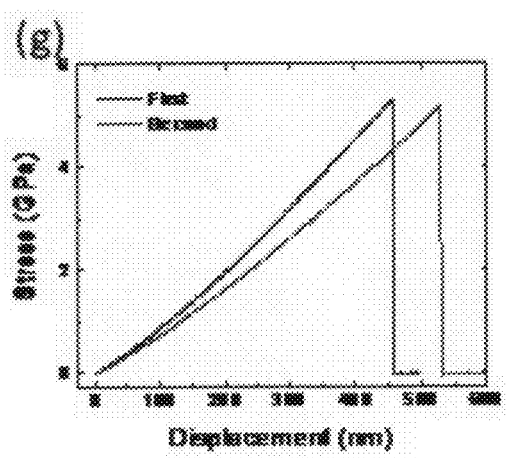

In-situ mechanical tests were conducted with an a-C deposited BNNT prepared by EBID. An individual BNNT was first isolated and attached to the AFM tip by EBID as shown in FIGS. 3a and 3b. The attached a-C/BNNT was then welded to another isolated a-C/BNNT by EBID. FIG. 3c shows electron microscope image of the engineered a-C/BNNT hybrid suspended between the AFM tip and the moving part. The thick deposition of a-C in the middle of a-C/BNNT hybrid was developed during the welding of the two hybrids. With the above set-up, the force direction was reversed to perform tensile testing. The tensile stress was calculated with the measured AFM sensor force divided by the cross-sectional area of the hybrids. The TEM images in FIGS. 3c and 3d are of the initial tensile test, while 3e and 3f are of a second test performed after rejoining the broken ends from the first test. The complete failures of the specimen are clearly seen in FIGS. 3d and 3f insets. Measurement of these broken ends resulted in external ($d_2$) diameters of 15.7 and 16.3 nm for the first and second tests, respectively. Analysis of the images taken near the fracture surfaces after the tensile experiments shows that approximately 90% of the material by volume was a-C, with BNNT comprising the remaining 10%. Using these diameters and the corresponding measured forces, the tensile strengths exhibited in these tests were found to be 5.29 and 5.16 GPa. These measured strength values are higher than that of the state-of-the-art CNT yarn (~1.2 GPa) [24], and comparable to the currently available Kevlar (~3.6 GPa) and carbon fibers (~4 GPa). It is notable that the tensile failure occurred at different locations during the two tests, rather than at the spot where rejoining was performed. This indicates that the a-C repaired joint between the two tubes is stronger than the eventual point of failure in the second tensile experiment. We also observe that in both cases the failure occurs through a sword-in-sheath-like mechanism [8], although only a relatively short length of the nested inner tube is pulled out of the outer tube. As a result, we see only a single, sharp failure event rather than an extended pull-out event at lower force as is sometimes seen in multiwall carbon nanotube tensile experiments [25]. The site for failure of the outer tube is likely determined by defects generated during the a-C deposition process, possibly including covalent bonding between the a-C and boron or nitrogen atoms of the tube. The formation of defects results in a decrease in tensile strength of the a-C/BNNT hybrid. It is less clear why the inner tube fails close to the site of failure of the external tube. Possible explanations include electron beam damage and cross-section variations found in BNNTs that are obstructions to tube sliding which must be broken before pull-out can occur [7]. While not ruling out either explanation, we note that the broken end of the inner tube exhibits a rather ragged, irregular shape, as opposed to the more clean fractures typically seen in CNTs [26].

Compression Tests on a-C/BNNT Hybrid

In another set of a-C joining experiments, FIG. 4 shows a series of TEM images during multiple mechanical tests with the same BNNT using a-C as a welding material. A pristine BNNT was attached to the AFM tip with a-C by using electron beam irradiation and then tested under compression until it fractured, but did not completely break in two (see FIGS. 4a-4d for TEM images of this test, and FIG. 4k, first test, for force-displacement data). The specimen was subsequently subjected to repair via electron beam joining with the beam focused to fill or cover the fractured area with a-C. The electron beam was subsequently spread to irradiate the entire tube and build up a-C along the tube surface to form an a-C/BNNT hybrid structure. After attaching to the AFM tip and performing a-C growth on the BNNT shown in FIG. 4a, the Young's modulus of the a-C coated BNNT under compression was determined to be 0.20 TPa (see FIG. 4a-4c). Here, the ratio of cross-sectional area between the a-C ($A_{a-C}$) and BNNT ($A_{BNNT}$) is 6.1 with the diameters of 6.4 and 17.1 nm prior and after the a-C deposition, respectively. This value is about four times less than the measured value of the individual pristine BNNT (0.84 TPa) discussed in the previous experiment. The reduction in Young's modulus is likely due to an increase in overall contribution of a-C as a result of the a-C deposition.

Figure 4A:
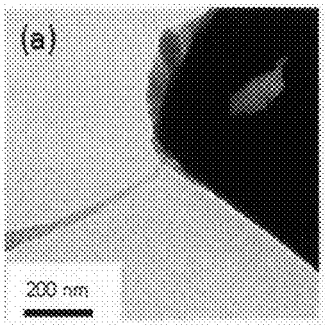
FIGS. 4a-4k show a series of TEM images during multiple mechanical tests with the same BNNT using a-C as a welding material.
Figure 4B:
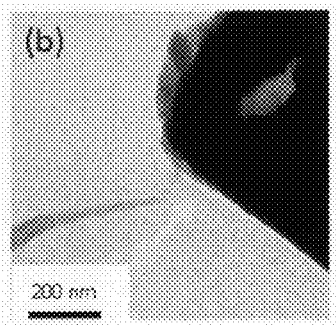
Figure 4C:
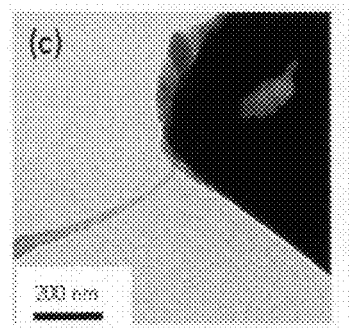
Figure 4D:
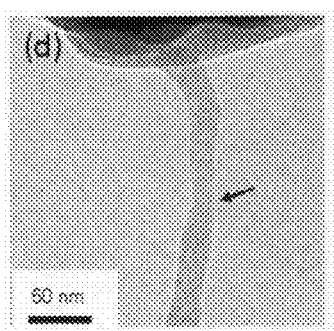
Figure 4E:
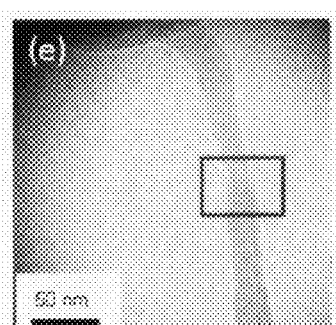
Figure 4F:
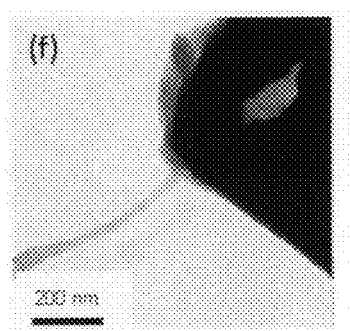
Figure 4G:
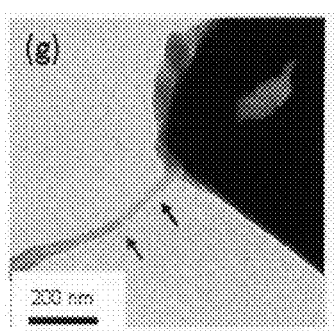
Figure 4H:
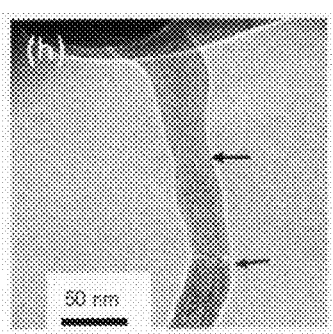
Figure 4I:
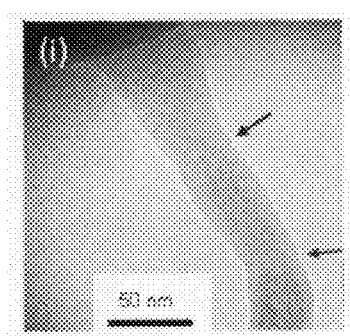
Figure 4J:
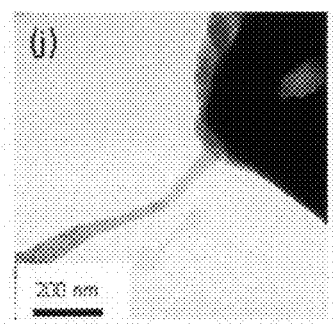
Figure 4K:
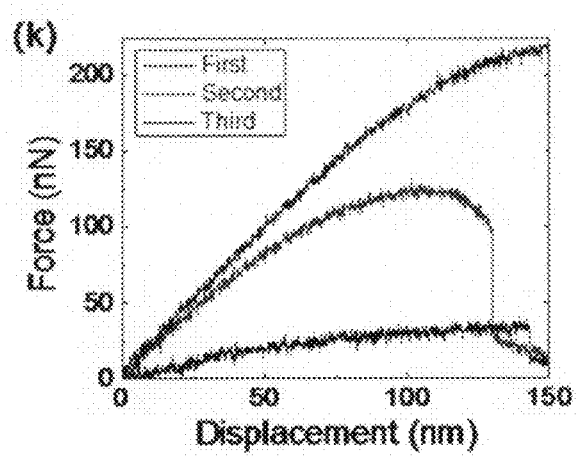

After the first compression test (crack location marked with a black arrow), the same a-C/BNNT specimen was repaired using a-C by electron beam joining (see FIGS. 4d and 4e). The repaired a-C/BNNT hybrid was subjected to compression testing again until it fractured prior to ultimate failure (see FIG. 4f-4g). The new crack did not appear at the previous repair site, but rather developed at a different location during the compression test shown in FIG. 4h (marked with a red arrow). The Young' modulus of the repaired a-C/BNNT hybrid structure (The ratio of cross-sectional area ($A_{a-C}/A_{BNNT}$) is 17.2) decreased to 0.10 TPa (FIG. 4k, red line). The hybrid structure did not break completely due to the resistance from the BNNT core which has a higher elastic modulus.

Figure 5A:
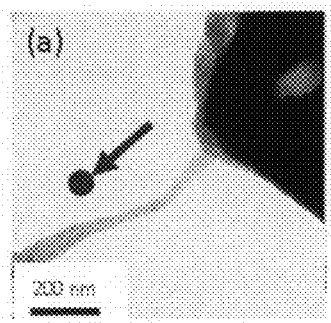
FIGS. 5a-5g show a series of TEM images and a stress-strain curve for the tensile testing of a-C/BNNT hybrid specimens.
Figure 5B:
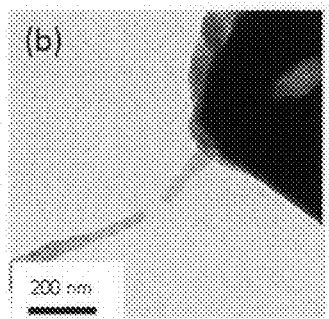
Figure 5C:
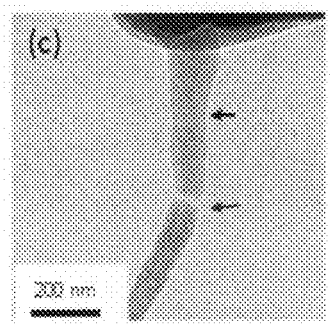
Figure 5D:
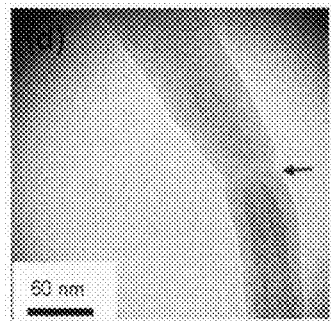
Figure 5E:
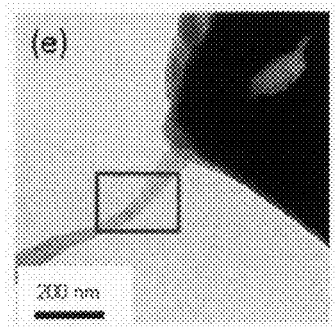
Figure 5F:
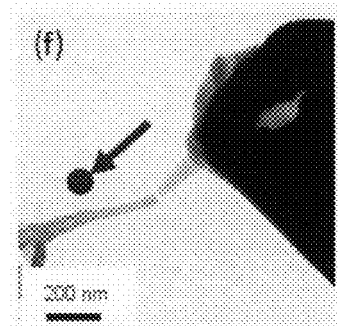
Figure 5G:
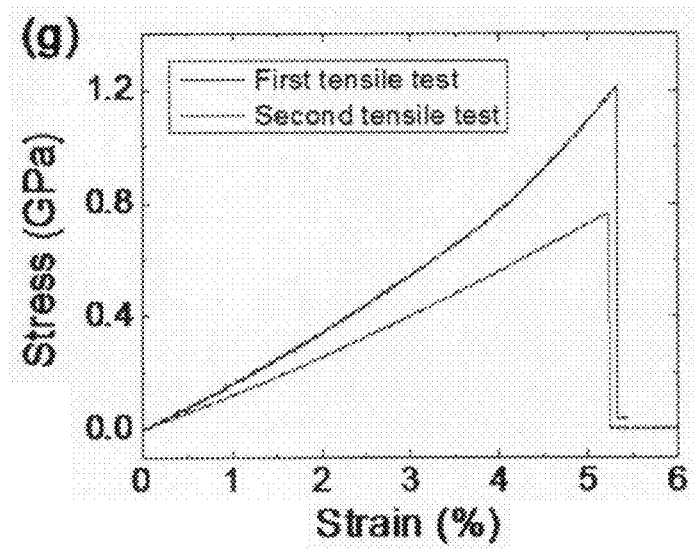

The tested sample was subsequently repaired a second time using electron beam joining with a-C. The crack was refilled with a-C using focused electron beam irradiation as shown in FIGS. 4h and 4i and then the repaired a-C/BNNT hybrid (The ratio of cross sectional area ($A_{a-C}/A_{BNNT}$) is 23.7) was retested (FIG. 4j). In this round, the Young's modulus dropped further to 0.086 TPa (FIG. 4k, blue line). The force displacement curves for the three tests are shown in FIG. 4k. Interestingly, upon the third compression test, the sample did not buckle or fracture up until 150 nm of displacement was reached, behaving in a more ductile manner. The maximum buckling stresses calculated from FIG. 4k were increased to 152, 213, and 277 MPa, respectively, with each successive compression test. The structural and mechanical properties of each BNNT and a-C/BNNT hybrid tested in this study are summarized in Table 1.

and joined with a-C (FIG. 5d). This repaired sample was subjected to tensile testing again and the failure occurred at the same location (FIGS. 5e and 5f). The tensile strength and strain of the end-to-end joint structure were 0.8 GPa and 5.2%. The results suggest that the mechanical properties are indicative of those of a-C, however, more experiments are needed to confirm this. The Young's moduli from the slopes in each test mentioned above were 35.3 and 16.2 GPa, respectively. The measured Young's modulus and strength of the a-C joint is an order of magnitude lower than that of simulated

TABLE 1

Characteristics summary of each BNNT and a-C/BNNT hybrid tested in this study.

| | External Diameter (nm)[a] | Internal Diameter (nm)[a] | Length (nm) | Young's Modulus (GPa) | Strength (GPa) | Strain (%) | Energy-to-failure (J/g) |
|---|---|---|---|---|---|---|---|
| Pristine BNNT, compression | 3.1 | 1.7 | 52 | 840 | — | — | |
| Pristine BNNT, Tensile | 2.7 | | 854 | 610 | 20.7 | 7.3 | 350 |
| a-C/BNNT Hybrid: | | | | | | | |
| 1$^{st}$ tensile break | 15.7 | | 1102 | | 5.29 | | |
| 2$^{nd}$ tensile break | 16.3 | | 1142 | | 5.16 | | |
| a-C/BNNT Hybrid: | | | | | | | |
| 1$^{st}$ compression | 17.1 | | 491 | 200 | — | — | — |
| 2$^{nd}$ compression | 27.3 | | 471 | 100 | — | — | — |
| 3$^{rd}$ compression | 31.8 | | 439 | 86 | — | — | — |
| Repaired a-C/BNNT Hybrid: | | | | | | | |
| (tip-to-tip joint) | | | | | | | |
| 1$^{st}$ tensile break | 31.8 | | 439 | 35 | 1.2 | 5.3 | — |
| 2$^{nd}$ tensile break | 39.8 | | 439 | 16 | 0.8 | 5.2 | — |
| a-C/BNNT Hybrid: | | | | | | | |
| (side-by-side joint) | | | | | | | |
| 1$^{st}$ lap-shear break | 55.8 | | — | — | 0.25 | 6.4 | — |

[a]External and internal diameters of individual BNNTs and a-C/BNNT hybrids were determined using TEM images of the failure site during tensile tests and from kinked sites during compression tests.

Tensile Tests on Repaired a-C/BNNT Hybrid

A series of TEM images and a stress-strain curve are presented in FIGS. 5a-5g for the tensile testing of a-C/BNNT hybrid specimens. Using the same set-up, the force direction was reversed to perform tensile testing. The tensile stress was calculated with the measured AFM force divided by the cross-sectional area of the hybrids. In this specific case, the external ($d_2$) diameters of the hybrids were 31.8, and 39.8 nm for each test as measured from the TEM images. The observation of the tip movement and the measured elongation of the a-C/BNNT hybrid structure under tensile load were used to calculate strain. The TEM images in FIGS. 5a and 5b are of the initial tensile test performed on the twice repaired compression specimen (FIG. 4j). The complete breakage of the sample is seen clearly in FIG. 5b. The tensile strength exhibited by this sample was 1.2 GPa. Two different slopes were apparent from the stress-strain curve for the first test shown in FIG. 5g. The tensile failure occurred at a location previously repaired by a-C (second repair, marked by a red arrow), and the broken section exhibited a clean break. The lower slope from the first tensile test is attributed to the tensile stress of the a-C layer while the higher slope above 4% strain is from the damaged BNNT beneath the a-C layers.

Electron beam induced end-to-end joining with a-C of the severed hybrid a-C/BNNT specimen is shown in FIGS. 5c and 5d. To form an end-to-end joint bonded with a-C, one broken end was precisely aligned with another broken end values of a-C cell with 50% of sp$^3$ sites by the tight-binding molecular dynamics simulation [27]. However, the mechanical properties of a-C joints could possibly be enhanced through graphitization of a-C by further heat treatment [21].

Lap Shear Tests on Repaired a-C/BNNT Hybrid

Figure 6A:
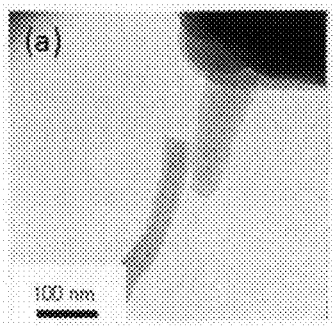
FIG. 6a shows the formation of a lap bond, by precisely aligning the broken ends from the above discussed tensile tests (specimen image from FIG. 5o to contact.
Figure 6B:
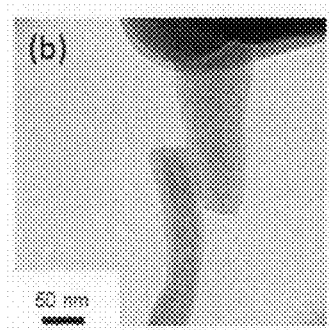
FIG. 6b shows the formation of a lap bond, by precisely aligning the broken ends from the above discussed tensile tests (specimen image from FIG. 5o to overlap and then joining by a-C via electron beam joining.
Figure 6C:
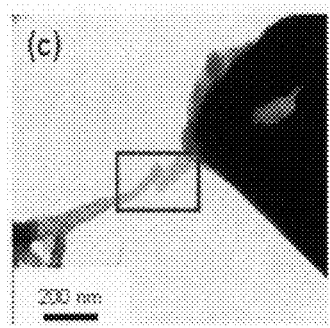
FIG. 6c shows first lap shear test specimen prepared by side-by-side electron beam joining.
Figure 6D:
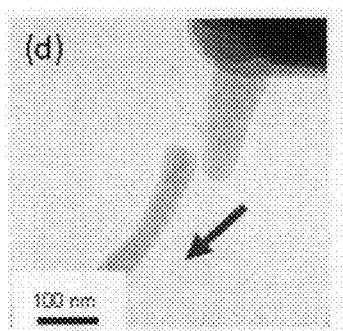
FIG. 6d shows the failure sample subjected to lap shear testing and the failure occurring at the a-C joint.
Figure 6E:
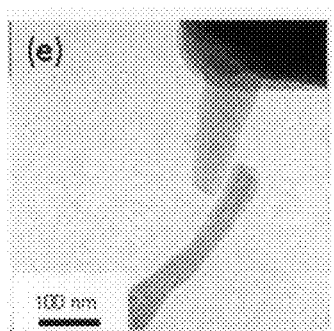
FIG. 6e shows residual a-C in the top half of the broken specimen and precisely aligning the broken ends from the above discussed first lap shear test to opposite side of the broken ends.
Figure 6F:
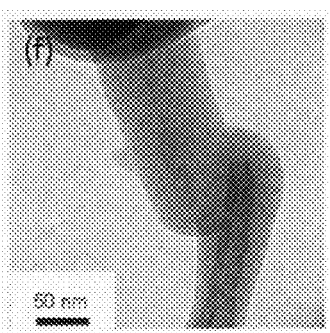
FIG. 6f shows the formation of a lap bond by a-C via electron beam joining and the access a-C joining via electron beam joining.
Figure 6G:
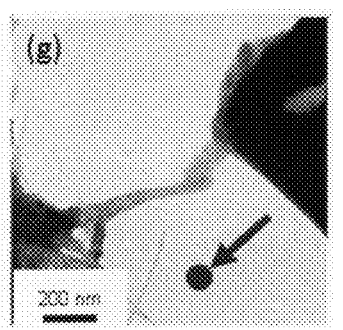
FIG. 6g shows the unbroken sample after second lap shear test.
Figure 6H:
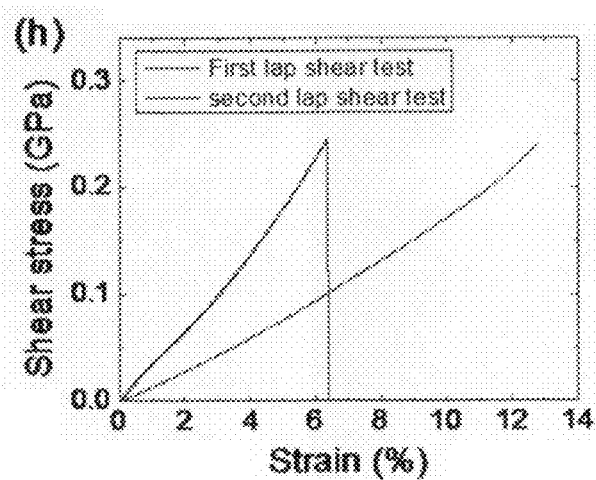
FIG. 6h shows lap shear stress-strain curves from two successive tests.

In order to form a lap bond, the broken ends from the above discussed tensile tests (specimen image from FIG. 5O were precisely aligned to overlap and then joined by a-C via electron beam joining (FIGS. 6a and b). This specimen configuration was tested to obtain lap shear strength under tension. The lap shear strength of the a-C bonded BNNT specimen was 0.25 GPa (FIGS. 6c and 6d), which is two orders of magnitude higher than what is found between the outermost shell and the neighboring inner shell of multi-walled CNTs (~0.3 MPa) [25]. The contact area on the lap shear test was assumed to be rectangular in shape with a contact length (86.5 nm) determined from the amount of overlap and a contact width equal to the a-C coated tube diameter (55.8 nm). FIG. 6h shows lap shear stress-strain curves from two successive tests. The lap shear specimen failed during 400 nm of piezo-actuator driven movement in the first test (FIG. 6d). Some residual a-C can be seen in the top half of the broken specimen (FIG. 6e), which indicates that the failure occurred predominately at the a-C joined site under the shear load. This specimen was manipulated so that the opposite surfaces which had not been previously bonded were aligned (FIG. 6e) and subsequently bonded with a-C (FIG. 6f). In this case, the specimen did not fail within 570 nm range of motion of the piezo-actuator (FIG. 6g), which equates to 12.8% strain.

Obviously, many modifications may be made without departing from the basic spirit of the present invention. Accordingly, it will be appreciated by those skilled in the art that within the scope of the appended claims, the invention may be practiced other than has been specifically described herein. Many improvements, modifications, and additions will be apparent to the skilled artisan without departing from the spirit and scope of the present invention as described herein and defined in the following claims.

LIST OF REFERENCES

[1] Golberg D, Bando Y, Huang Y, Terao T, Mitome M, Tang C and Zhi C 2010 *ACS Nano* 4, 2979-2993
[2] Hernandez E, Goze C, Bernier P and Rubio A 1998 *Phys. Rev. Lett.* 80, 4502-4505
[3] Golberg D, Costa P M F J, Lourie O, Mitome M, Bai X, Kurashima K, Zhi C, Tang C and Bando Y 2007 *Nano Lett.* 7, 2146-2151
[4] Chopra N G and Zettl A 1998 *Solid State Commun.* 105, 297-300
[5] Wong E W, Sheenhan P E and Lieber C M 1997 *Science* 277, 1971-1975
[6] Treacy M M J, Ebbesen T W and Gibson J M 1996 *Nature* 381, 678-680
[7] Wei X, Wang M-S, Bando Y and Golberg D 2010 *Adv. Mater.* 22, 4895-4899
[8] Yu M-F, Lourie 0, Dyer M J, Moloni K, Kelly T F and Ruoff R S 2000 *Science* 287, 637-640
[9] Zhu Y and Espinosa H D 2005 *Proc. Natl. Acad. Sci. USA* 102, 14503-14508
[$^1$0] Dalton A B, Collins S, Muñoz E, Razal J M, Ebron V H, Ferrari J P, Coleman J N, Kim B G and Baughman R H 2003 *Nature* 423 703
[11] Liu K, Sun Y, Lin X, Zhou R, Wang J, Fan S and Jiang K, 2010 *ACS Nano* 4, 5827-5834
[12] Kis A, Csanyi G, Salvetat J-P, Lee T-N, Couteau E, Kulik A J, Beniot W, Brugger J and Forro L 2004 *Nature Mater.* 3, 153-157
[13] Krasheninnikov A V and Banhart F 2007 *Nature Mater.* 6, 723-733
[14] Peng B, Locascio M, Zapol P, Li S, Mielke S, Schatz G C and Espinosa H D 2008 *Nature Nanotechnol.* 3, 626-631
[15] Filleter T, Bernal R, Li S and Espinosa H D 2011 *Adv. Mater.* 23, 2855-2860
[16] Braga S F and Galvão D S 2006 *Chem. Phys. Lett.* 419, 394-399
[17] Smith M W, Jordan K C, Park C, Kim J-W, Lillehei P T, Crooks R and Harrison J S 2009 *Nanotechnology* 20, 505604-505610
[18] Banhart F 2001 *Nano Lett.* 1, 329-332
[19] Torrones M, Banhart F, Grobert N, Charlier J-C, Terrones H and Ajayan P M 2002 *Phys. Rev. Lett.* 89, 075505
[20] Madsen D N, Mølhave K, Mateiu R, Rasmussen A M, Brorson M, Jacobsen C J H and Bøggild P 2003 *Nano Lett.* 3, 47-49
[21] Wang M, Wang J, Chen Q and Peng L-M 2005 *Adv. Func. Mater.* 15, 1825-1831
[22] Wang M, Peng L-M, Wang J and Chen Q 2006 *Adv. Func. Mater.* 16, 1462-1468
[23] Wei X L, Liu Y, Chen Q and Peng L-M 2008 *Nanotechnology* 19, 355304
[24] Naraghi M, Filleter T, Moraysky A, Locascio M, Loutfy R O and Espinosa H D 2010 *ACS Nano* 4, 6463-6476
[25] Yu M-F, Yakobson B I and Ruoff R S 2000 *J. Phys. Chem. B* 104, 8764-8767
[26] Cumings J and Zettl A 2000 *Science* 289, 602-604
[27] Fyta M G, Remediakis I N and Kelires P C 2006 *Phys. Rev. Lett.* 96, 185503

What is claimed is:

1. A method for joining boron nitride nanotubes, comprising: providing a plurality of BNNTs; precisely aligning the BNNTs to form a contact area and depositing amorphous carbon on the surface of the BNNTs at the contact area to form bonded hybrid a-C/BNNT structures in which load is transferred between the BNNTs by amorphous carbon disposed between the BNNTs.

2. The method of claim 1 wherein the BNNs are fabricated by a pressurized vapor/condenser method using $CO_2$ laser.

3. The method of claim 1 wherein the BNNTs are crystalline.

4. The method of claim 1 wherein the BNNTs consist of at least one of single walled and multi-walled BNNTs.

5. The method of claim 1 wherein the BNNTs have diameters of less than 7 nm.

6. The method of claim 1 wherein the amorphous carbon is deposited on the BNNT surface by electron beam induced deposition.

7. A method for repairing boron nitride nanotubes, comprising: providing at least one damaged BNNT having a damage site; depositing amorphous carbon on the surface of the at least one damaged BNNT at the damage site to form hybrid a-C/BNNT at the damage site.

8. The method of claim 7 wherein the at least one BNNT is fabricated by a pressurized vapor/condenser method using a $CO_2$ laser.

9. The method of claim 7 wherein the at least one BNNT is crystalline.

10. The method of claim 7 wherein the at least one BNNT is a few-walled BNNT.

11. The method of claim 7 wherein the at least one BNNT has diameters of less than 7 nm.

12. The method of claim 7 wherein the amorphous carbon is deposited on the surface of the at least one BNNT by electron beam induced deposition.

13. A method for forming hybrid a-C/BNNT structures, comprising: providing a plurality of BNNTs; precisely aligning the BNNTs to form a contact area and depositing amorphous carbon on the surface of the BNNTs at the contact area to form bonded hybrid a-C/BNNT structures in which load is transferred between the BNNTs by amorphous carbon disposed between the BNNTs.

14. The method of claim 13 wherein the BNNTs are fabricated by a pressurized vapor/condenser method using a $CO_2$ laser.

15. The method of claim 13 wherein the BNNTs are crystalline.

16. The method of claim 13 wherein the BNNTs consist of at least one of single walled and multi-walled BNNTs.

17. The method of claim 13 wherein the BNNTs have diameters of less than 7 nm.

18. The method of claim 13 wherein the amorphous carbon is deposited on the BNNT surface by electron beam induced deposition.

* * * * *